United States Patent [19]

Zeilon

[11] Patent Number: 4,743,367
[45] Date of Patent: May 10, 1988

[54] CONTACT APPARATUS

[76] Inventor: Sten Zeilon, Heimdalsgatan 21, S-261 62 Glumslöv, Sweden

[21] Appl. No.: 31,016
[22] PCT Filed: Jun. 5, 1986
[86] PCT No.: PCT/SE86/00260
 § 371 Date: Feb. 4, 1987
 § 102(e) Date: Feb. 4, 1987
[87] PCT Pub. No.: WO86/07287
 PCT Pub. Date: Dec. 18, 1986

[30] Foreign Application Priority Data

Jun. 7, 1985 [SE] Sweden ............................. 8502821

[51] Int. Cl.⁴ ............................................. B01F 3/04
[52] U.S. Cl. ...................................... 210/150; 55/234; 210/242.1; 261/35; 261/81; 261/120; 261/64.1
[58] Field of Search ................ 210/150, 242.1; 261/120, 81, 35, 64.1; 55/234

[56] References Cited

U.S. PATENT DOCUMENTS

| | | | |
|---|---|---|---|
| 907,583 | 12/1908 | Earnshaw | 261/81 |
| 3,275,147 | 9/1966 | Gilde | 210/150 |
| 3,617,541 | 11/1971 | Pan | 210/17 |
| 3,664,647 | 5/1972 | Snow et al. | 261/120 |
| 3,788,616 | 1/1974 | Clough, Jr. | 261/81 |
| 4,086,167 | 4/1978 | Tapola et al. | 210/150 |
| 4,211,647 | 7/1980 | Friedman et al. | 210/150 |
| 4,253,851 | 3/1981 | Brooks et al. | 55/234 |
| 4,422,930 | 12/1983 | Hatanaka | 210/150 |
| 4,448,593 | 5/1984 | Spiers | 261/120 |
| 4,668,388 | 5/1987 | Dibble et al. | 210/150 |

FOREIGN PATENT DOCUMENTS

| | | | |
|---|---|---|---|
| 2116996 | 10/1971 | Fed. Rep. of Germany . | |
| 2755327 | 6/1979 | Fed. Rep. of Germany . | |
| 3312367 | 10/1984 | Fed. Rep. of Germany | 261/120 |
| 2157947 | 6/1973 | France . | |
| 347436 | 8/1972 | Sweden . | |
| 111113 | 1/1918 | United Kingdom | 261/81 |
| 2035284 | 6/1980 | United Kingdom | 210/150 |

Primary Examiner—Tim Miles
Attorney, Agent, or Firm—Laurence R. Brown; Alfred J. Mangels

[57] ABSTRACT

An apparatus for establishing contact between a gas and a liquid comprises a contact body (3), means for wetting the body (3) with a liquid (1) and means for exposal of the wetted body (3) to a gas (2), said body (3) being mounted in an airtight chamber (4) being provided with openings (5,6) for passage of liquid (1) and conduits (8) for inlet and outlet of gas (2) to the chamber (4), a driving device (7) being arranged for forced inlet and outlet of gas (2).

7 Claims, 5 Drawing Sheets

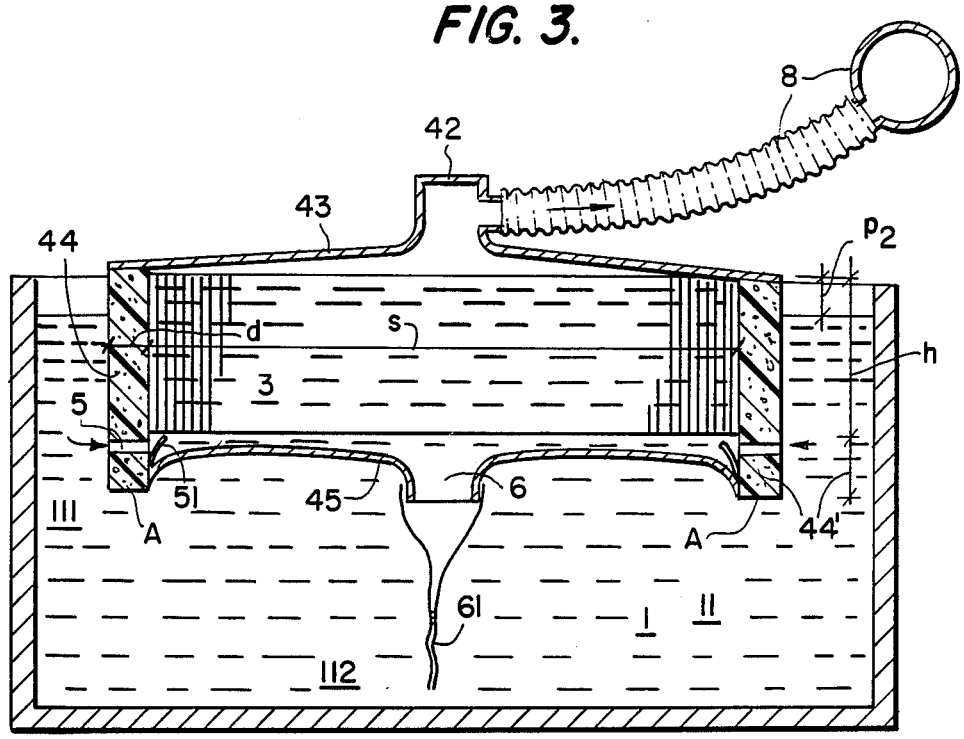
FIG. 3.
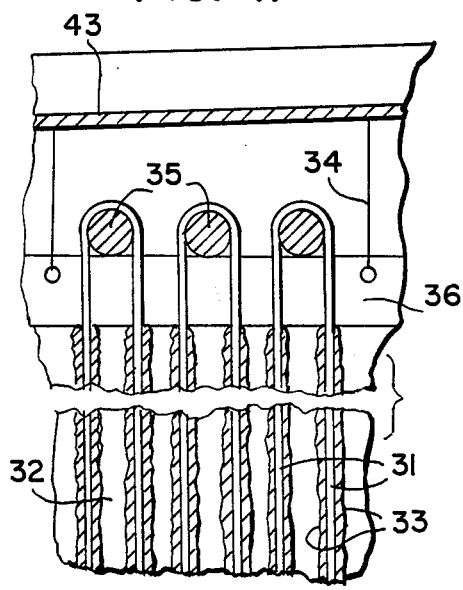
FIG. 4.
FIG. 5.

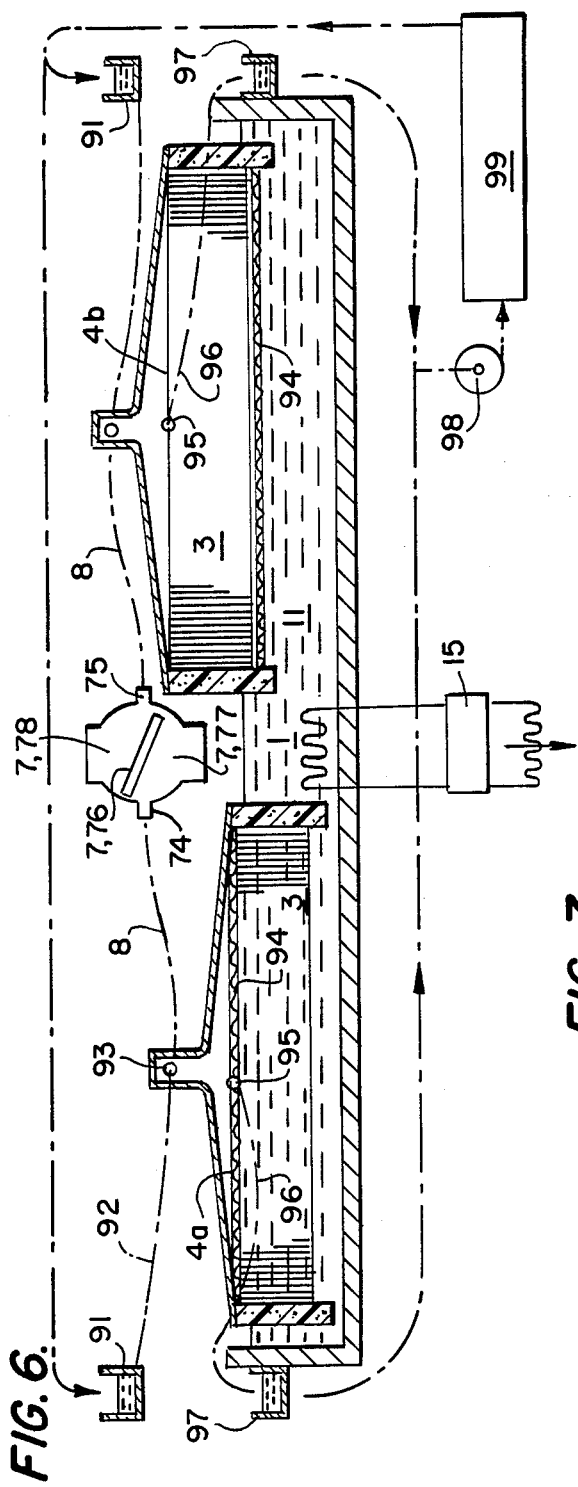
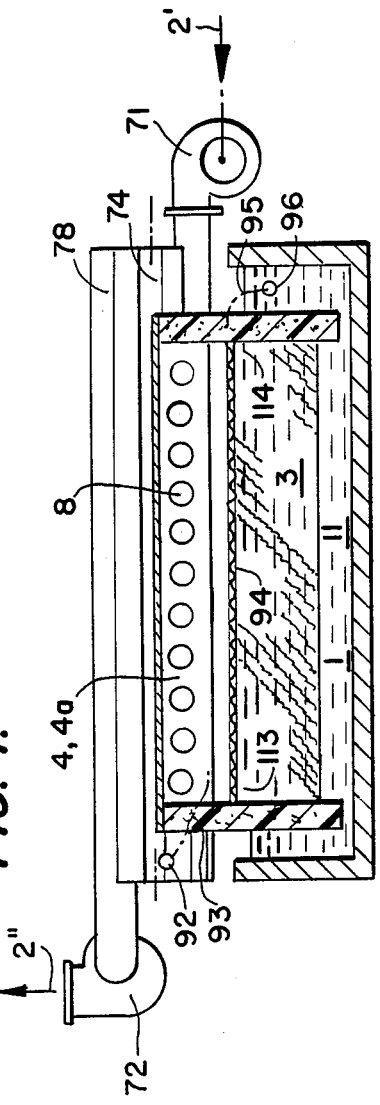
FIG. 6.
FIG. 7.

CONTACT APPARATUS

The present invention relates to a fundamental problem in many processes of a biological, chemical and physical nature, namely how to arrange a contact/reaction surface between a gas and a liquid to optimize process efficiency between the two media versus cost of running and maintenance.

As examples of such biological processes can be mentioned aerobic bacteria processes such as nitrification or fermentation, where a contact surface exposed to water, nutrients and exchange of oxygen and carbon dioxide, acts as a carrier of active bacteria films.

Another biological/chemical process can involve treatment of straw in aerobic conditions, either by chemical means or by means of bacteria. In this example the straw material in itself constitutes the contact surface.

Physical processes may include heat and vapour exchange between a gas flow and open liquid films, distributed over a contact surface, processes such as heat exchange, evaporation, condensation or diffusion.

Another example of physical nature is the scrubbing of a gas flow from solids by close contact with a wetted surface.

In most applications the contact surface material is inert and acts primarily as means for spreading a liquid flow to thin liquid films, exposed to a gas flow. Obviously, the main technical object is in the best manner possible, costwise and maintenancewise, to provide large surface areas and a high quality of wetting and flow conditions.

Well known are the following types of contact apparatus, grouped according to working technique:
A. Open sprinkling of liquid flow over a contact body. A gas flow is driven through the contact body.
B. A contact body is immersed in liquid. A gas flow is bubbled through the contact body.
C. A contact body is formed as a rotor, rotated partly in a liquid, partly in a gas.

All these techniques are characterized by continous flows of one or both media. For groups "A" and "B" this fact results in the establishment of stable, stratified media flows, which furthermore tend to collect in certain preferred flowpaths, thus twofold offsetting process efficiency. For group "A", preferred for large scale operations, the pumping and uniform sprinkling of liquid can also be problematic, especially for contaminated or highly viscous liquids.

For group "C" stable, stratified liquid flows are avoided by the inherent, intermediate dipping action of the contact body in the liquid bath, resulting in excellant wetting and transfer conditions. A drawback of this type of contact apparatus is a high mechanical load on the contact body and a corresponding high cost. Therefore it is limited in use to small scale operations.

The present invention relates to a contact apparatus comprising a contact body of spaced surface material, means for wetting said body with a liquid and means for exposure of the wetted body to a gas.

The object of the invention is to provide a contact apparatus, which can operate in a wide span of both scale and mode of operations and which offers many improved qualities in efficiency, reliability and cost, as listed below:

Excellent heat/mass transfer due to unstable, unstratified flow conditions.

Complete, uniform wetting of the contact body, even for contaminated or highly viscous liquids.

Straight, vertical flowpaths in the contact body at a minimum of flow resistance.

A very high ratio between contact body surface and contact body volume can be used, without offsetting wetting properties or inducing prohibitable flow resistance.

Extremely large amounts of liquid are periodically exposed as liquid films with very small mechanical efforts and power requirements.

Simple, reliable mechanics, operated solely by low pressure pneumatic means.

The above listed objects and other objects mentioned below may be obtained by a contact apparatus of the type referred to above, which according to the invention is characterized in that said apparatus also comprises an open bath of said liquid, chambers partly immersed in said bath, said chambers enclosing said contact body, chamber openings for liquid communication between said bath and a free space of said chambers and said body and a driving device for cyclically forced injection respectively ejection of gas to and from said free space through gas conduits.

The mechanical system can according to the invention be designed as a low powered swinging system.

A two-phase liquid system, for example mineral oil/water for absorption of hydrocarbons from air, can be utilized without undue mixing of the phases.

The thermal mass in the bulk of liquid is far greater than the thermal mass of the bulk of gas. Reaction temperature is thus determined by the temperature of the liquid bath. As an example, a low reaction temperature for improved absorption processes may be maintained by cooling the liquid bath. Due to a batchwise, discontinous totally dipping operation a fire cannot be supported, for example in the case mentioned of absorption of hydrocarbons from air in mineral oil films.

The invention will be described in more detail below, reference being made to the accompanying drawings, in which FIGS. 1, 2 and 3 illustrate in plan and sections a fishpond for raising fish with partly immersed chambers for aeration and nitrification of the water bulk.

FIG. 4 shows a detail of the contact material used.

FIG. 5 illustrates cyclic working pressures of fans used for operating the device.

FIGS. 6, 7 and 8 illustrate in sections a plant for absorbtion of hydrocarbon solvents from air and FIG. 9 an example of contact material thereby used.

EXAMPLE 1

Bacteriological treatment of water

Figure 1:
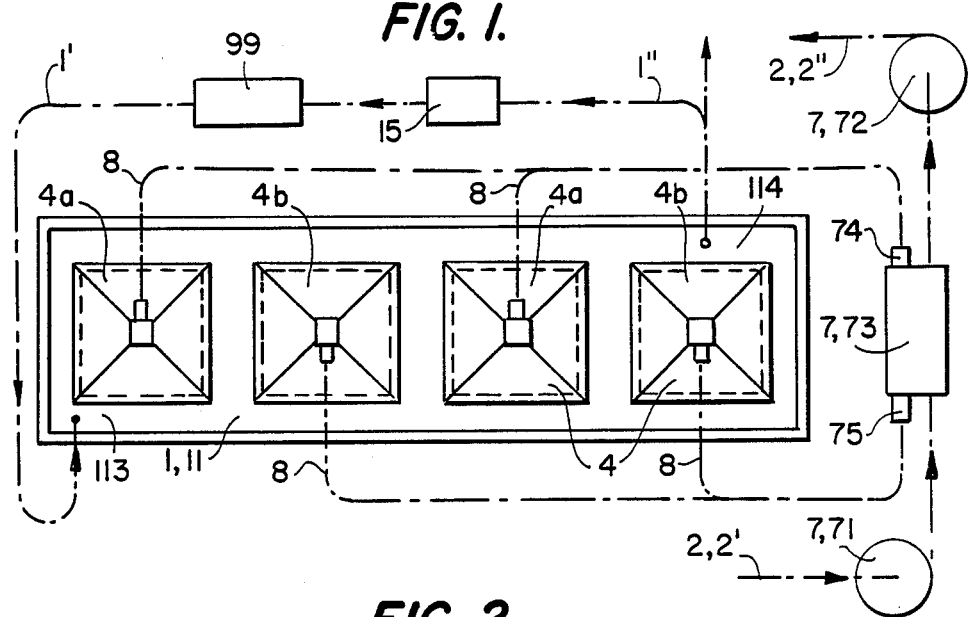

Referring to FIGS. 1, 2, 3, and 5 a plant according to the invention comprises a bath 11 of a liquid 1, in this case water for raising fish. Partly immersed in the water are adequate numbers of airtight chambers 4, which are partly filled with a contact body 3 of spaced contact material 31. One half 4a of the chambers 4 are through flexible gas conduits 8 connected to one 74 of two outlets 74,75 of a periodically operable, between injection or ejection of gas, working valve device 73, while the other half 4b of the chambers 4 is similarly connected to the other outlet 75.

A continously running injection fan 71 for a process gas 2', in this case fresh oxygen rich air, and a continously running ejection fan 72 for a processed gas 2", in this case oxygen poor and ammonia and carbon dioxide enriched air, are coupled to the valve device 73 and by its operation periodically and conversely coupled with the separate halves 4a and 4b respectively of the chambers 4. Due to this operation the free space of chamber 4 and contact body 3 will effectively be filled with either gas 2 or liquid 1, causing the chambers 4 to raise or sink, respectively in the bath 11.

The chambers 4 communicate with the bath 11 through inlet openings 5 along lower parts of their vertical sidewalls 44, supplied with check valves 51, and through an outlet opening 6 and a thin plastic film hose 61, extended towards the bottom of the bath. The suction action of gas will thus propulse an intake of a process liquid 1', in this case ammonia enriched, oxygen poor water, from one region 111 of the bath 11. Pressure action of the gas will propulse an outflow of processed liquid 1'', in this case oxygen enriched water with lessened ammonia content, into another region 112 of the bath 11. This procedure will result in a powerful circulation of the liquid bulk.

The chamber sidewalls 44 are fitted with a certain floating power to prevent tilting of the chambers. They may thus be made of light closed cell foam material. Attached to the sidewalls 44 is a bottom cover plate 45 and a top lid 43, gently sloping upwards towards a connection 42, leading to said gas conduit 8.

Preferably the floating power of the sidewalls 44 is designed as follows in order to equalize the maximum gas injection pressure $p_1$ to the maximum gas ejection pressure $p_2$, which will result in a minimum of fan work and a minimum of mechanical load on the chamber structure. The dimensions used in a chamber, quadratic in plane are as follows:

| | |
|---|---|
| inside side length of chamber | = s m |
| inside height of contact body | = h m |
| bottom area of sidewalls | = A m² |
| specific weight of drained contact body | = z ton/m³ |
| specific weight of water filled contact body | = 1 ton/m³ |
| specific weight of cellfoam | = 0 ton/m³ |

The weight of the chamber structure excluding the contact body is supposed to be borne by a lower portion 44' of the sidewalls, extended into the bath 11.

Figure 2:
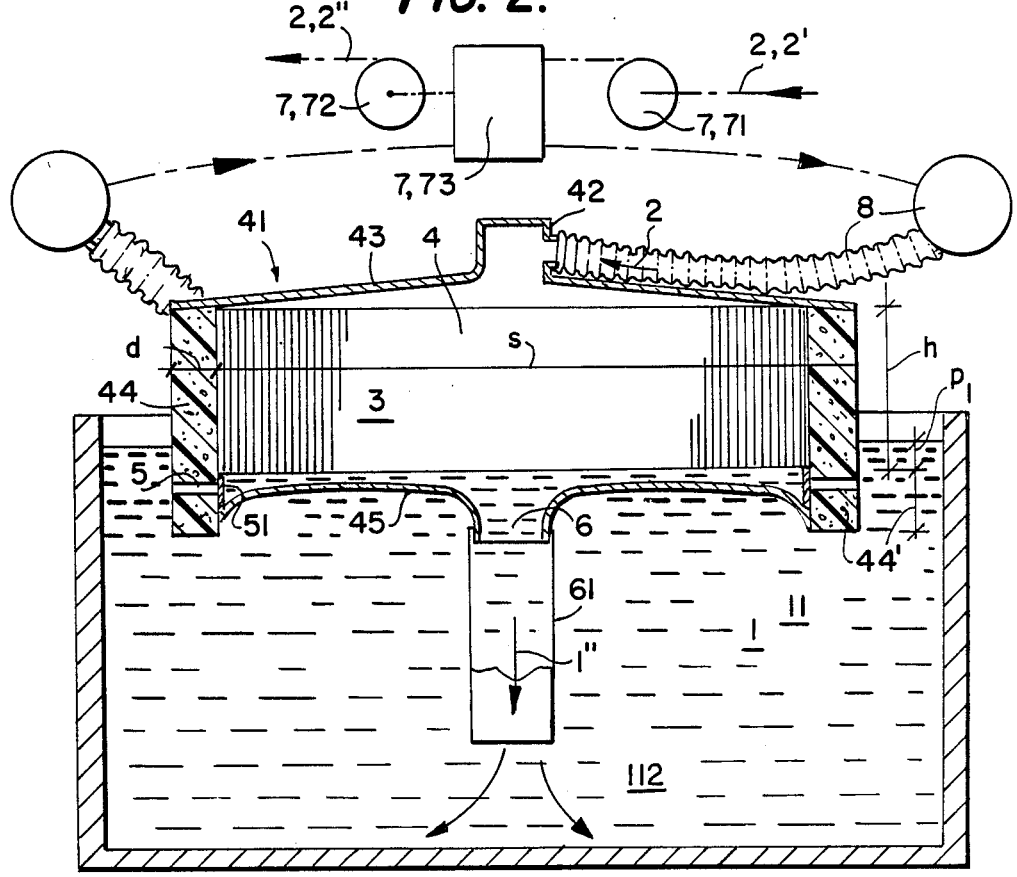
Figure 8:
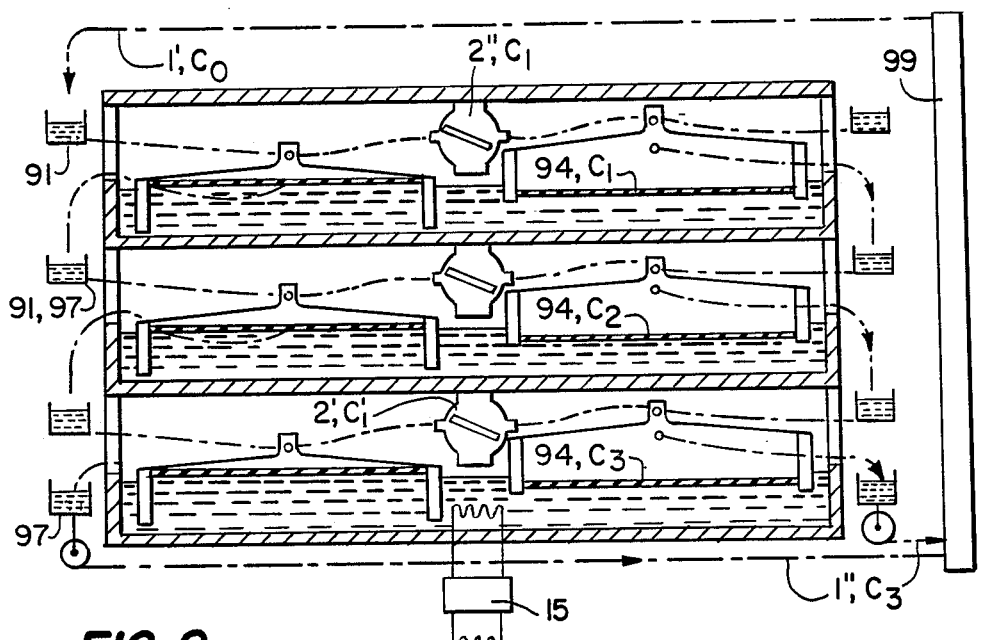
Figure 9:
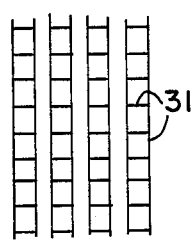
Figure 10:
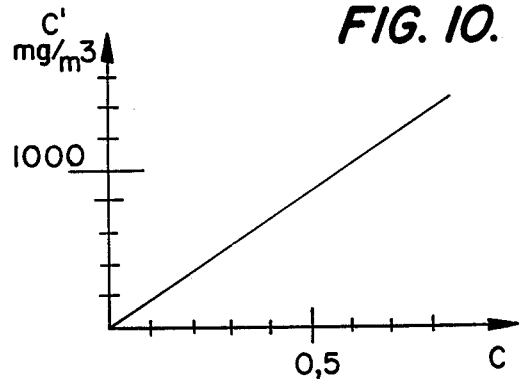
FIGS. 10 and 11 illustrate flow and absorption conditions for a three-step absorption process according to FIG. 8
Figure 11:
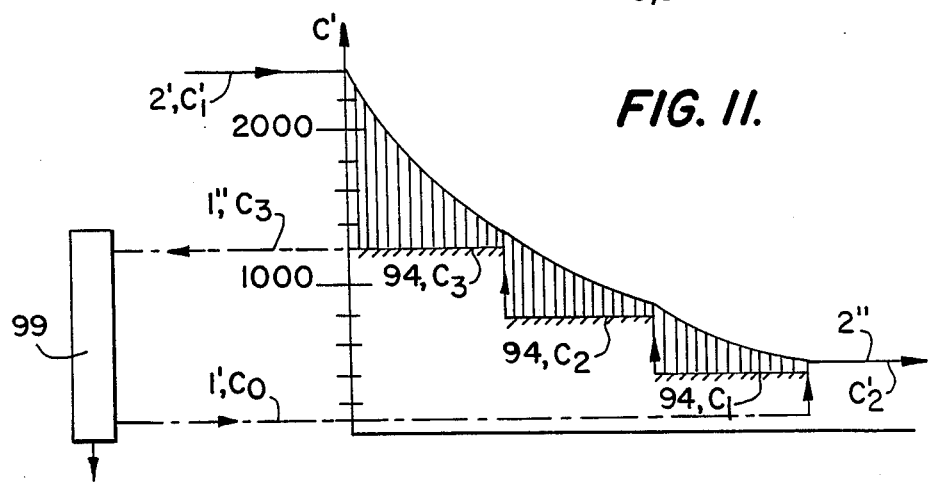

The maximum injection pressure $p_1$ in mwp is reached as illustrated in FIG. 2, when the contact body 3 is totally gas filled and the chamber 4 is at its highest level. The principle of Archimedes gives the relation:

$$p_1(A+s^2) = hs^2 z \text{ or}$$

$$p_1 = hs^2 z/A + s^2$$

Maximum ejection pressure $p_2$ in mwp is reached as illustrated in FIG. 3, when the contact body 3 is totally water filled and the chamber is at its lowest level. The following relation applies:

$$p_2 s^2 = A(h - p_2) \text{ or}$$

$$p_2 = A/A + s^2$$

Equalizing $p_1$ and $p_2$ gives the relations:

$$A = zs^2 = 4sd \text{ or}$$

$$d = sz/4$$

where "d" denotes the wall thickness of the sidewall 44

$$p_1 = p_2 = zh/1 + z$$

For instance, with a chamber dimensioned with a side length s=3.0 m, with a contact body height h=0.7 m and with a specific weight of drained contact body z=0.3 ton/m³, following applies:

sidewall thickness $d = 3 \times 0.3/4 = 0.23$ m $$p_1 = p_2 = 0.3 \times 0.7/1.3 = 0.16 \text{ mwp}$$

With the chambers 4 thus balanced the working pressures of either fan 71 and 72 fluctuate between periodically positive and negative values $= \pm p_1$ according to FIG. 5. This diagram indicates the swinging nature of the system. The power consumption of the fans varies correspondingly, and with adequate means, e.g. by supplying the fan wheels with appropiate mass, a small mean power consumption may be needed to withhold the operation.

The pneumatic driving system is very reliable.

The contact body 3 is preferably arranged as illustrated in FIG. 4, with straight, vertical pathways 32 for an air- or water flow in alternating contact with a bacteria film 33, growing on the vertically arranged surface material 31. The straight pathways result in a minimum of flow resistance and effective rinsing of dead bacteria mass. The surface material can in a manner known per se be a plain or corrugated sheet material, textile fabric or mesh, all preferably made of a plastic material. The load of the contact body and the bacteria film is preferably carried by the chamber lid 43 by means of appropriate supports 34,35 and 36. With a mean thickness of 2 mm of bacteria film 33 and a center to center distance of 12 mm between surfaces the specific weight of drained contact body will average 0.3 ton/m³.

The function of the plant involves improved aeration of the bath and improved nitrification of ammonia, produced in the bath. Due to the extremely large quantities of water circulated through the bath and the contact body, a flow about 50-100 times larger than is practically obtainable in a contact apparatus of said type "A", a heavy nutrient supply of ammonia is at hand for the bacteria film, in spite of the low concentration of ammonia that can be allowed in the bath, not to damage the fish. An effective nitrification rate is thus obtained.

The effective water filling of the contact body prevents furthermore hatching of flies and worms, otherwise prominent in group "A" apparatus and destructive to nitrification rates.

The above described plant differs only in details from plants for other applications, as exemplified below.

E.g. it is possible to perform a biological treatment of a flow of waste water, entering as process water 1' at one portion 113 of the bath 11 and leaving as processed water 1'' at another portion 114 of the bath.

It is also possible to carry out a fermentation process with liquid 1 being a bacteria suspension and nutrition being added to the bath according to bacteria growth.

A further possibility is absorption in the water phase of certain solvents in an exhaust air flow 2', solvents acting as nutrients to a bacteria suspension 1 in the bath.

Finally cooling, condensation, scrubbing and chemical treatment of a gas, exhaust air or smoke 2 may be obtained by circulating the bath liquid 1 in heat exchange with a cooling plant 15 and through an appropriate chemical regeneration plant 99.

EXAMPLE 2

Absorbtion of hydrocarbon solvents from air

Referring to FIGS. 6, 7, 8, 9, 10 and 11 the plant comprises an open bath of water 11 and two chambers 4*a*, 4*b*, operated counterwise in the manner previously described by periodic injection of exhaust air 2' with a content of a hydrocarbon solvent as toluene, and ejection of cleaned air 2". In this case the chambers lack the previously mentioned bottom plate 45, but are otherwise designed as is described in connection with FIGS. 1, 2 and 3.

A flow of mineral oil with a high boiling point is circulated in the following manner. From a reservoir 91 it falls by gravity through a flexible conduit 92 and enters a chamber 4 at an inlet 93 and a bath portion 113 as a process liquid 1', lean in toluene concentration. The flow spreads as a top layer of oil over the water bath 11 inside the chambers 4. As liquid films on the contact body 3 the oil flow will absorb toluene from the air flow 2' and leaves the chamber at an outlet 95 and bath portion 114 as a processed liquid 1", enriched in toluene.

By gravity the flow then falls through a flexible conduit 96 to a reservoir 97 and is by a pump 98 finally driven through a regeneration plant 99 and back as a lean solution 1' to the reservoir 91.

Each of the said chambers 4*a*, 4*b* are by a number of flexible gas conduits 8 connected to elongated outlets 74, 75 of a valve device 7. These outlets communicate, due to a cyclic, mechanically driven movement of an elongated damper 76, in periodic fashion with either of a lower duct 77 for gas injection connected to said fan 71 or an upper duct 78 for gas ejection, connected to said fan 72.

The plant also comprises a heat pump 15 in heat exchange with the bath 11 for cooling the water 1 and consequently the exhaust air flow 2'. The purpose of cooling is twofold, namely maintaining a low absorption temperature for improved absorption rate and secondly for recovery of enthalpy in the exhaust air flow.

A suitable contact body 3 is illustrated in FIG. 9 and is composed of a number of 4 mm sheets of extruded polypropene under the trade name "Corrox", spaced vertically 2 mm apart. A cross section shows a plurality of channels, square in section, formed by surface material 31 of 0.2 mm thickness. One cubic meter of contact body will thus contain around 1000 $m^2$ of contact surface. The mean diffusion way length amounts to 0.5 mm. One cubic meter will expose 1000 $m^2$ of a mineral oil film of approximately 0.1 mm thickness, i.e. 0.1 ton of oil to a gas volume of 0.8 $m^3$ for each dipping cycle. Tests on the absorption rate of the described contact body using a pulsation rate of 600 cycles/h show that equilibrium states are closely reached, where the solvent concentration in air C' mg/$m^3$ is in equilibrium with the solvent concentration C in weight percent in the oil bulk, as illustrated in FIG. 10 for a mineral oil used and for an absorption temperature of +5° C.

Improved absorption is in known manner achievable by forcing in a countercurrent mode the liquid and the gas media through consecutive steps, as illustrated by a 3-step plant according to FIGS. 8 and 11. The apparatus comprises three plants as described above with reference to FIGS. 6 and 7, placed on the top of each other in a concrete structure. A process gas 2' enters at the bottom plant, a processed gas 2" leaves at the top plant, a process liquid 1' enters the top plant, is propelled by gravity through the plants and leaves the bottom plant as a processed liquid 1".

Processed liquid 1" is regenerated in a regeneration plant 99 and returned as process liquid to the plants.

The apparatus may be specified as follows. An exhaust air flow 2' of 12,000 $m^3$/h or 4 kg/s, of temp. +25° C., of R.H.=60% and of toluene concentration $C_1'=2400$ mg/$m^3$ enters the bottom plant, where the water bath is kept chilled to +5° C. by means of a heat pump 15. Enthalpy change of air flow, chilled from +25° C. to +5° C., amounts to 37 kJ/kg or totally 150 kw and is by means of said heat pump 15 in known manner recovered to source of air exhaust. Water vapour condensation will amount to 6.5 g/kg or totally 90 kg/h and this flow of condensation water will collect in the water bulk of the bath 11.

The chambers 4*a*, 4*b* are cycled 600 cycles/h and are designed with a free space of 10 $m^3$ or a total contact body of 10/0.8=12.5 $m^3$, disposed as $sxsxh=4\times4\times0.8$ m. According to the mentioned formulas the maximum of fan pressures will be $p_1=p_2=zh/1+z=0.2\times0.8/1.2=0.13$ mwp Appropriate side wall thickness will be $$d=sz/4=4\times0.2/4=0.2 \text{ m}$$

The total vertical movement of the chambers will amount to $h-p_1-p_2=0.8-0.13-0.13=0.5$ m.

The overall dimensions of the apparatus will be of the order $L\times B\times H=10\times5\times6$ meters. matically in FIG. 11. For each absorbtion step the oil bulk in each layer 94 is considered having a uniform toluene concentration $C_1$, $C_2$, and $C_3$ respectively, which are represented in the diagram according to FIG. 11 at their equilibrium levels. For each absorption step applies, that change of toluene amount is equal for both gas and liquid flows, which together with an initial concentration $C_0=0.05\%$ in the process liquid 1' will result in approximate values of $C_1=0.2\%$, $C_2=0.4\%$ and $C_3=0.7\%$. The necessary oil flow will amount to 3600 kg/h and total amount of toluene recovered to 24 kg/h or with a 6000 h/year run to 150 tons/year.

In this case, the specific use of a bath of water and an absorbtion liquid lighter and unmixable with water has many advantages. Thus the bulk of processing liquid in operation can be minimized and condensed water from the cooled air flow be taken care of in the water bulk. Liquid flow resistance through the contact body is kept at a minimum, since the main liquid bulk is water with low viscocity. Fire hazard is also limited and is furthermore limited as mentioned by the operating mode of the device.

Undue mixing of the two liquid phases is avoided by the gentle non-turbulent operation of the device.

To sum up, the described contact apparatus, combined with a heat pump and a liquid regeneration plant is an efficient and reliable tool for recovery of both enthalpy and solvents from a toluene enriched exhaust air flow. Other solvents may be absorbed from gases in a similar manner, when using appropriate process liquids.

EXAMPLE 3

Chemical or bacteriological treatment of straw

Figure 12:
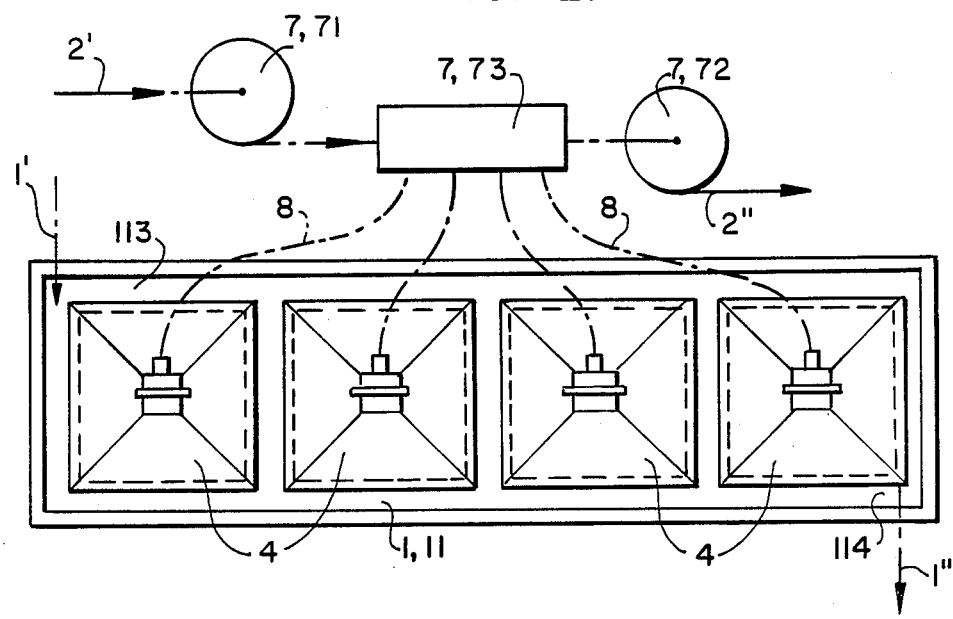
FIGS. 12 and 13 show in plan and section a plant for treatment of straw material.
Figure 13:
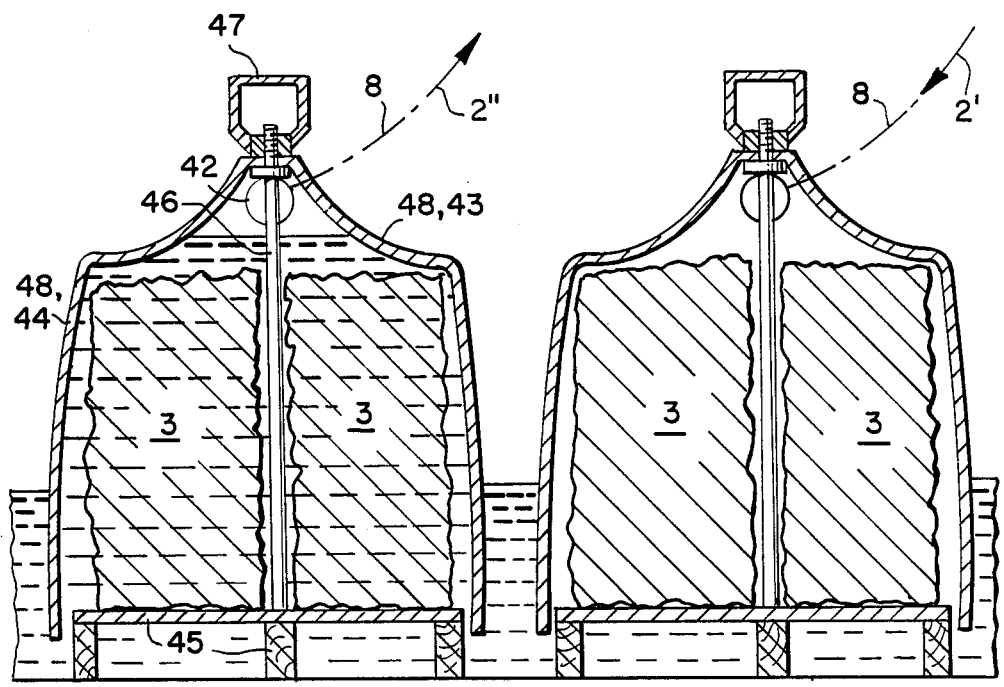

Referring to FIGS. 12 and 13 a plant comprises a bath 11 of a water solution of chemicals or bacteria nutrients and airtight chambers 4, immersed in the bath. The chambers 4 are through flexible conduits 8 according to a periodically shifting pattern connected to a gas injection/gas ejection device 7, comprising a valve device 73, an injection fan for process air 2′ and an ejection fan for processed air 2″. Compressed straw material is stacked inside the chambers 4, constituting a contact body 3, that takes part in a chemical or bacteriological process, activated by alternating wetting and aeration of the straw.

The specific weight of the wetted, compressed straw is fairly high. Therefore the chambers in this case rest permanently on a bottom plate of the bath 11 during treatment. For simple loading/unloading of the chambers and handling of loaded chambers to and from the bath by forklift or the like, the chambers 4 comprise a bottom pallet 45, an airtight cover vessel 48 comprising said chamber lid 43 and chamber sidewalls 44, extended over the perimeter of the pallet 45 and an outlet 42 to the said gas conduit 8.

By a vertical, central bar 46 the cover vessel 48 is anchored during treatment to the pallet, thus prevented from raising in the bath during gas injection. As an anchoring device may be used a combination of nut and hook 47, the hook designed for fork lift handling of the loaded chambers to and from the bath.

Due to the working mode of the device according to the invention an active injection/ejection of gas and an efficient drainage/wetting may be obtained also in case a dense contact body is used e.g. a compressed straw material.

I claim:

1. A contact apparatus, comprising a contact body (3) of spaced surface material (31), means for wetting said body with a liquid (1) and means for exposure of the wetted body to a gas (2) characterized in that said apparatus also comprises an open bath (11) of said liquid (1), airtight chambers (4, 4a, 4b) partly immersed in said bath (11), said chambers (4, 4a, 4b) enclosing said contact body (3), chamber openings (5, 6) for liquid communication between said bath (11) and a free space of said chambers (4, 4a, 4b) and said body (3), and a driving device (7) for cyclically forced injection and ejection respectively of gas to and from said free space through gas conduits (8).

2. An apparatus as claimed in claim 1 characterized by said driving device (7) comprising a pressure fan (71) for injection of said gas (2) as a flow of process gas (2′), a suction fan (72) for ejection of said gas as a flow of processed gas (2″) and a cyclically working coupling device (73) for groupwise, cyclically coupling of said chambers (4,4a,4b) to said fans (71,72).

3. An apparatus as claimed in claim 1 characterized by each of said chambers (4,4a,4b) comprising one set of check valve (51) operated inlet openings (5) communicating with a first portion (111) of said bath (11) and another set of check valve (61) operated openings (6) communicating with a second prtion (112) of said bath (11).

4. An apparatus as claimed in claim 1 characterized by also comprising an inlet (93) of a flow of a process liquid (1′) in one portion (113) of said bath (11) and an outlet (95) of a flow of processed liquid (1″) from another portion (114) of said bath (11).

5. An apparatus as claimed in claim 4 characterized by further comprising a regeneration plant (99) for regeneration of said flow of processed liquid (1″) to said flow of process liquid (1′).

6. An apparatus as claimed in claim 1 characterized by comprising a heating or cooling plant (15) for heating or cooling said liquid (1).

7. An apparatus as claimed in claim 1 characterized by that said chambers (4, 4a, 4b) comprise within vertical sidewalls (44) a balancing floating power from a bulk of lightweight material of such a magnitude that top fan pressures ($p_1$, $p_2$) needed for full injection and full ejection respectively of said gas (2) are of the same order.

* * * * *